United States Patent
Kuntz et al.

(10) Patent No.: US 10,522,258 B2
(45) Date of Patent: Dec. 31, 2019

(54) SEALING OF A CRACK IN A POOL OF A NUCLEAR FACILITY, USING A ROBOT

(71) Applicant: ELECTRICITE DE FRANCE, Paris (FR)

(72) Inventors: Marc Kuntz, Veneux-les-Sablons (FR); Mathieu Lamontagne, Saint-Amable (CA)

(73) Assignee: ELECTRICITE DE FRANCE, Paris (FR)

( * ) Notice: Subject to any disclaimer, the term of this patent is extended or adjusted under 35 U.S.C. 154(b) by 880 days.

(21) Appl. No.: 14/418,574

(22) PCT Filed: Jul. 30, 2013

(86) PCT No.: PCT/FR2013/051841
§ 371 (c)(1),
(2) Date: Jan. 30, 2015

(87) PCT Pub. No.: WO2014/020280
PCT Pub. Date: Feb. 6, 2014

(65) Prior Publication Data
US 2015/0200026 A1    Jul. 16, 2015

(30) Foreign Application Priority Data
Jul. 31, 2012 (FR) ..................... 12 57424

(51) Int. Cl.
*G21C 9/00* (2006.01)
*G21C 19/20* (2006.01)
(Continued)

(52) U.S. Cl.
CPC ....... *G21C 19/207* (2013.01); *E04G 23/0214* (2013.01); *G21C 13/028* (2013.01);
(Continued)

(58) Field of Classification Search
CPC .... G21C 19/07; G21C 13/028; G21C 17/013; E04G 23/0214
(Continued)

(56) References Cited

U.S. PATENT DOCUMENTS 4,345,658 A * 8/1982 Danel .................. B62D 57/024
180/164
2010/0192368 A1* 8/2010 Kramer ............... E04G 23/0218
29/824

FOREIGN PATENT DOCUMENTS

DE   298 22 221 U1   8/1999
EP   0 010 034 A1    4/1980
(Continued)

OTHER PUBLICATIONS

Machine translation of FR 2874020.*
(Continued)

*Primary Examiner* — Marshall P O'Connor
(74) *Attorney, Agent, or Firm* — Drinker Biddle & Reath LLP

(57) ABSTRACT

The sealing of a crack in a pool of a nuclear facility, using a robot. The sealing, concerns in particular, that of a crack in a wall of a pool of a nuclear facility. In particular, it implements a mobile robot carrying an adhesive tape dispenser. At least the following are provided: controlling a plurality of suction systems, the dispenser being mechanically integral with a first suction system, and controlling the movement of the first system relative to the other systems of said plurality of systems.

12 Claims, 3 Drawing Sheets

(51) Int. Cl.
*E04G 23/02* (2006.01)
*G21C 13/028* (2006.01)
*G21C 17/013* (2006.01)

(52) U.S. Cl.
CPC ........... *G21C 17/013* (2013.01); *Y10S 901/40* (2013.01); *Y10S 901/44* (2013.01)

(58) Field of Classification Search
USPC ........................................................ 376/203
See application file for complete search history.

(56) References Cited

FOREIGN PATENT DOCUMENTS

| | | | |
|---|---|---|---|
| FR | 2 874 020 A1 | 2/2006 | |
| FR | 2874020 A1 * | 2/2006 | ......... E04G 23/0203 |
| JP | 62-111544 U | 7/1987 | |
| JP | 04-309890 A | 11/1992 | |
| JP | 06-201896 A | 7/1994 | |
| JP | 11-079019 A | 3/1999 | |
| JP | 2004-323621 A | 11/2004 | |

OTHER PUBLICATIONS

English language translation of Office Action issued in related application JP 2015-524836, dated Dec. 21, 2015, 6 pages.
Office Action issued in related application CA 2,879,919, dated Feb. 3, 2017, 4 pages.

* cited by examiner

SEALING OF A CRACK IN A POOL OF A NUCLEAR FACILITY, USING A ROBOT

CROSS-REFERENCE TO RELATED APPLICATIONS

This application is the U.S. national phase of the International Patent Application No. PCT/FR2013/051841 filed Jul. 30, 2013, which claims the benefit of French Application No. 12 57424 filed Jul. 31, 2012, the entire content of which is incorporated herein by reference.

FIELD

The invention relates to sealing a crack in a pool wall in a nuclear facility.

Such cracks can occur in pool walls, particularly at the welding seams in the lining which is usually made of steel. For example, the inner walls of such pools may be covered with sheets of stainless steel and the edges of the sheets are welded to each other. Said cracks often occur at these welds.

BACKGROUND

In such cases, an adhesive tape made of an adhesive polymer (for example an elastomer and/or silicones or other, with selected additives) is used to cover welds at these cracks when such cracks occur, as described in particular in document FR 2874020.

The adhesive has a protective coating, for example in the form of a film of stainless steel, usually similar to the pool walls. For example, the tape may be applied along the seam between two sheets of a wall, to cover a crack that has formed in the weld between sheets (due to wear, corrosion, etc.). This step is often conducted while the pool is full of water that may be contaminated by radiation from the spent nuclear fuel it contains. It is undesirable to involve a diver in sealing the crack. A robot could be used to apply an adhesive tape of the aforementioned type to the crack, after a prior phase of locating and detecting defects or cracks.

It could be arranged, for example, to have a mobile robot at the bottom of the pool, supporting an articulated arm for reaching cracks high on the vertical walls of the pool. Such pools are deep, however, typically reaching depths of around 14 meters. An angular misalignment, however small, is likely to generate unacceptable positioning errors when placing the tape over a crack. In particular, a very small positioning error tolerance is desired. The tape is about 40 mm wide and the weld, where the crack to be covered is likely to be, can be up to about 6 mm wide. Furthermore, a positioning error tolerance for the tape is required that corresponds to at least 15 mm of adhesive beyond the weld, leaving a positioning error tolerance of 2 mm allowed between the center of the tape and the center of the weld. The positioning error tolerance is therefore 2 mm with an articulated arm 14 meters long. The required angular precision is 0.008 degrees, which is difficult if not impossible to achieve in practice (particularly because of the intrinsic mechanical flexibility of the arm).

SUMMARY

The invention improves the situation.

For this purpose, it proposes a method for sealing a seam in a wall of pool of a nuclear facility (this seam may or may not have a crack). In particular, this method makes use of a mobile robot carrying a dispenser of adhesive tape coated with a protective material (for example stainless steel). In the method, at least the following are provided:

controlling a plurality of suction systems, the dispenser being mechanically integral with a first suction system, and controlling the movement of the first system relative to the other systems of said plurality of suction systems.

Thus, said plurality of suction systems allows retaining the robot assembly on a vertical wall of the pool, for example by the suction of suction cups, and the first suction system to which the dispenser is attached can move relative to the other suction cups in order to adjust the position of the dispenser, and thus of the tape, relative to the crack or more generally to the seam to be sealed.

It thus becomes possible to unwind the tape continuously and along a great length. It is then possible to cover an entire seam, for example at the weld between two sheets (typically for the entire aforementioned 14 meters), as this seam is likely to exhibit cracks, but without worrying about the actual existence and exact location of these cracks.

Moreover, the defect detection/location phase is no longer necessary. This detection is usually conducted manually (which raises the problem of protecting the operator from radiation). In addition, it remains imprecise and limited. Through-cracks creating an opening of less than 90 µm are not detected. The term "through-crack" here is understood to mean that the crack forms an opening to the other side of the sheets, which are no longer fluid-tight.

This detection phase requires several days of intervention, in an outage schedule that is already usually very tight.

In addition, the formation of a crack is part of a fatigue process that is not dependent on the local dose. Therefore one cannot predict the location or number of through-crack defects.

The invention overcomes these constraints by sealing all accessible welds, rendering the detection-location phase optional.

The above controlling steps can be performed remotely from a control station which, for example, receives images from cameras mounted on the robot.

In one embodiment, a frame is provided comprising one or more suction systems, as well as a crosspiece movably mounted in the frame and supporting the first suction system and the dispenser.

In this embodiment, the crosspiece may be movable in translation along a first direction of the frame.

In this embodiment, the crosspiece may support an arm mechanically integral with the dispenser and this arm can be mounted to move in translation relative to the crosspiece in at least a second direction that is different from the first direction. Such an embodiment ensures, for example, a movement in a plane parallel to the wall to be sealed, said two directions defining this plane. Of course, this arm may also support a vertical shaft for adjusting the height of the dispenser head, and thus apply the tape it carries against the seam to be sealed.

In one embodiment, the dispenser can be placed outside the frame, which allows better dispenser accessibility in tight areas (areas cluttered with filtration/lighting/ladder equipment) or, more generally, over uneven contours, for example if plates were fillet-welded. For this purpose, the very structure of a tape having a flexibility suitable for such placement and comprising an elastomer coated with a stainless steel film is advantageous in itself.

In one general embodiment, the first suction system may be mounted to rotate relative to the other suction systems, which allows changing the movement direction of the robot, or for example precisely adjusting the path over a wall seam.

In one embodiment, to move the dispenser relative to a wall of the pool, alternating steps are ordered which comprise at least the following:
- activating the suction systems while deactivating the first suction system,
- moving the first suction system relative to the other suction systems in a given direction,
- activating the first suction system while deactivating the other suction systems,
- moving the first suction system relative to the other suction systems in a direction opposite the given direction.

In one embodiment, the suction systems comprise suction cups with backflow of fluid, for example remotely controlled. Such an embodiment allows, for example, ordering a rapid movement of the dispenser relative to a pool wall.

In one embodiment, as the dispenser comprises a head that presses the tape against the wall, said head may be equipped with a servomotor. Such an embodiment allows, for example, guaranteeing optimal contact during tape application. An alternative is to wrap the tape around a roller divided, for example, into at least two parts and mounted on two springs at the head end of the dispenser, as discussed below with reference to FIG. 3. As the tape is flexible, it can then follow the contours of an edge or an uneven surface.

The invention also concerns a robot comprising means for implementing the invention presented above, and more particularly a mobile robot for sealing cracks in a wall of a spent fuel pool, carrying an adhesive tape dispenser and comprising:
- a plurality of suction systems, the dispenser being mechanically integral with a first suction system, and
- movement means for moving the first system relative to the other systems of said plurality of suction systems.

It should be noted that the robot can also adapt to and operate in an air environment for all seam repair (between any liners), thus avoiding not only the detection-location phases but also the erection of scaffolding (for example for maintenance operations on internal metal liners sealing the concrete wall of the reactor building for example).

The invention also relates to a facility comprising such a robot and means for remotely controlling the suction systems and motor means comprised in the robot.

It will be understood that the robot, by its system for movement over the vertical walls of a pool by means of said suction systems, enables it to be autonomous on site, although remotely controlled by a control station of a facility in the sense of the invention. However, the movement of the robot can be controlled very precisely and in general allows extreme accuracy in positioning the head of the dispenser relative to the crack, or more generally to the seam, to be sealed. Furthermore, in an advantageous embodiment, to avoid drift due to long application lengths, the robot may be equipped with a system for realignment during application without damaging the tape. This realignment is made possible by the accurate positioning of the robot, as the increment of the positioning motors is preferably 0.01° in rotation and 0.25 mm in translation.

BRIEF DESCRIPTION OF THE DRAWINGS

Other features and advantages of the invention will become apparent upon reading the exemplary non-limiting embodiments described below, and upon examining the accompanying drawings in which.

DETAILED DESCRIPTION

Figure 1:
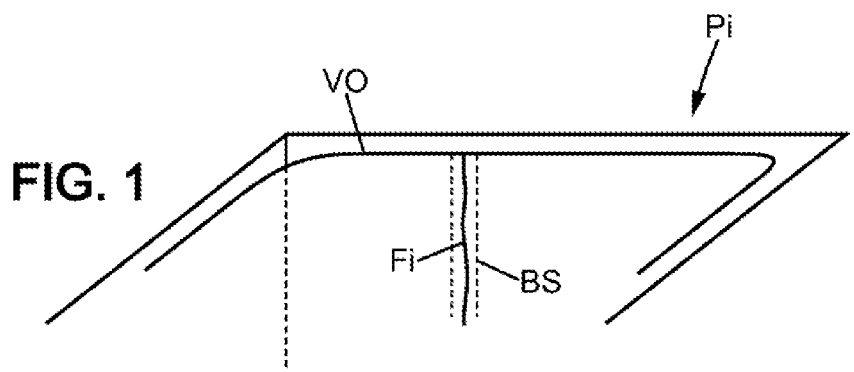
FIG. 1 schematically illustrates a pool having a crack which is to be covered with an adhesive sealing tape.

We first refer to FIG. 1 to explain one possible context for an advantageous use of a robot in the sense of the invention. Here, a pool (denoted PI) of a nuclear facility, for example for the storage of spent fuel, happens to develop a crack FI. Usually a weld is made between the steel walls of the pool, for example between sheets of stainless steel VO. In the example of FIG. 1, these sheets consist of stainless steel plates assembled on the internal walls of the pool.

Figure 2:
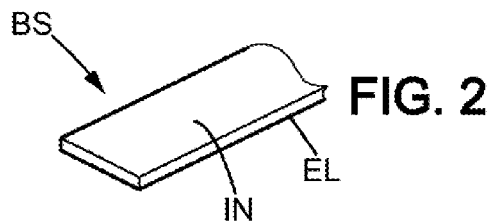
FIG. 2 schematically represents a cross-section of such a tape.

It has generally been observed that as the sheets age, if a crack appears it starts at this weld. Usually, the crack is covered by an adhesive tape BS in the form of a strip, often continuous, as shown in FIG. 2. The tape comprises in particular an adhesive polymer EL (for example an elastomer) covered with a protective film IN for example of stainless steel. Advantageously, such a tape structure gives it great flexibility, especially for application on edges or uneven areas, as discussed below.

Figure 3:
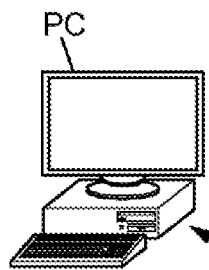
FIG. 3 illustrates a tape dispenser.
Figure 3:
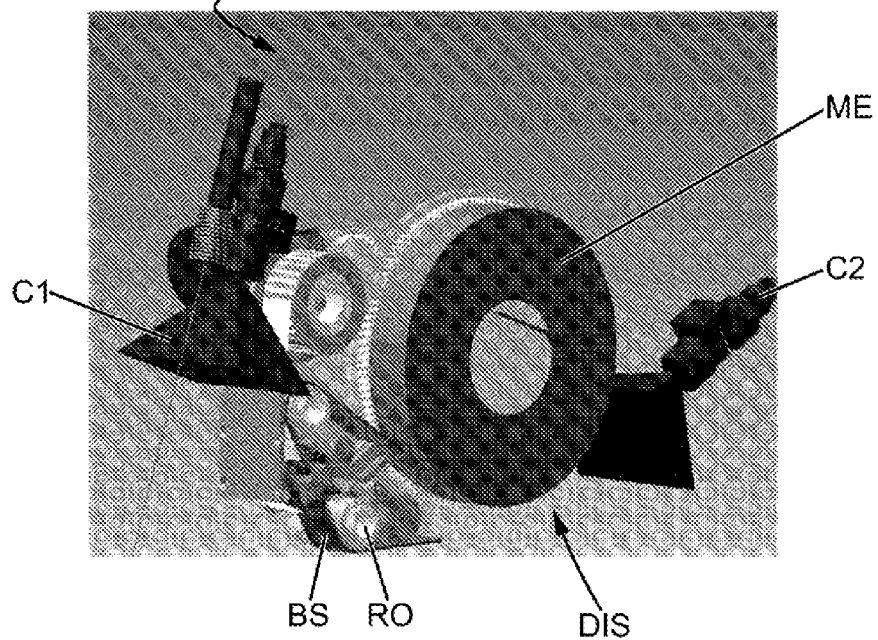

Referring to FIG. 3, the adhesive tape BS is wrapped around rollers RO supporting the tape BS, which is driven by a ring gear and pinion mechanism ME comprised in the dispenser DIS. In particular, it may be advantageous to provide at least two half-rollers RO mounted on separate springs, at the head end of the dispenser, to allow applying the tape over a sharp edge or onto two surfaces where there is a height difference between them. With one half-roller being free relative to the other, the head can then absorb contour variations during tape application.

Additionally or in a sophisticated variant, the head of the dispenser can be equipped with a servomotor that changes the height of the head based on the resistance encountered relative to a particular contour.

It is understood that the head of the dispenser DIS can fit into tight areas of the pool, for example under pipes conveying fluids or ladder rungs, or other areas.

Particularly in the context of the present invention, the adhesive tape is particularly thin (a few millimeters) and therefore flexible. It is thus possible to apply the tape under the above conditions (tight areas, sharp edges, etc.) and to do so over long distances.

In addition, as the robot can be moved over a vertical wall of the pool, and this can be done with very precise positioning of the dispenser head relative to a given point on the wall, it is possible to lay the tape along a very long weld. Such an embodiment advantageously shortens repair operations on spent fuel pools by eliminating the conventional phase of detecting defects, including through-cracks. Currently, spent fuel pool repairs require a prior detection phase.

It is only once the defects are detected that they are sealed. In general, defects are detected by an ACFM (Alternative Current Field Measurement) method: an electric current is injected by probe along the weld, then analysis of the generated magnetic field translates the dimensions and location of through-cracks (cracks extending through the thickness of a sheet). The embodiment illustrated in FIG. 3 eliminates this detection phase because it proposes the application of repair tape along a very long distance, made possible due to the extreme thinness of the tape and the automation of the tape application which thus covers the entire length of the welds with no need to wonder whether or not there are through-cracks. If all accessible welds are covered by this material, the detection phase becomes unnecessary. In practice, the service life of the tape can then govern the maintenance schedule for the pool walls. For example, the order of magnitude of the tape service life may be ten years. Maintenance can thus be scheduled every ten years.

Advantageously, a front camera C1 and a rear camera C2 are mounted on the dispenser DIS, for controlling its movement from a remote control station (denoted PC in FIG. 3) and approaching the dispenser head to a crack to be sealed, or more generally to a seam to be covered. In addition, laser sources (denoted LA in FIG. 4) are provided for optimal fine-tuning of its position relative to the seam.

Figure 4:
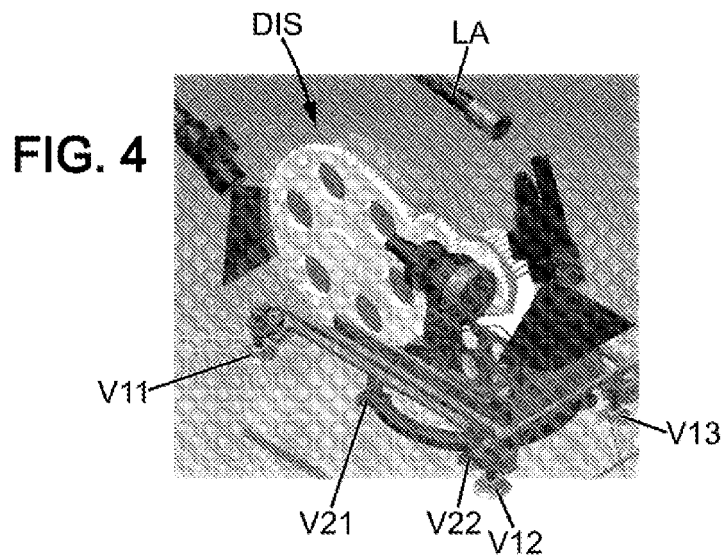
FIG. 4 illustrates the dispenser installed in a platform integral with the movement means of the dispenser, these means being based on a suction cup system.
Figure 5A:
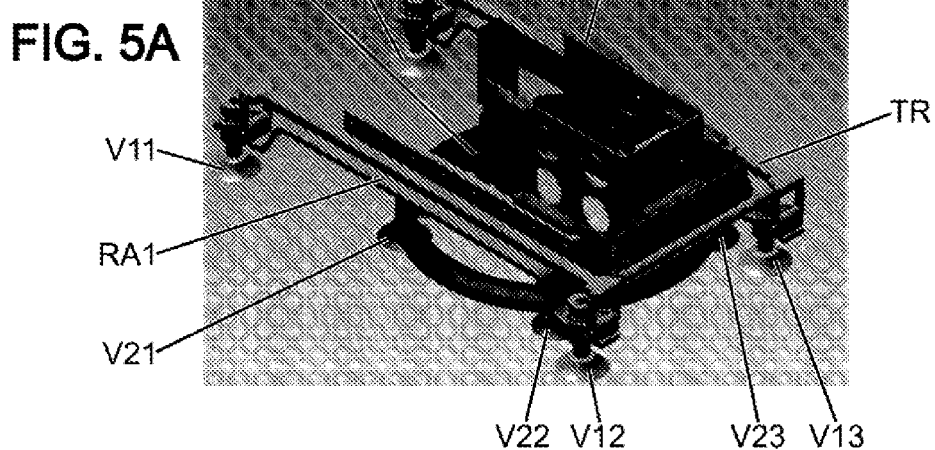
FIG. 5A specifically represents the movement means of the dispenser using such a suction cup system.

Referring to FIG. 4, the dispenser DIS is mounted on a platform (denoted SO in FIG. 5A), said platform being mechanically integral to a movement system with suction cups V11, V12, V13, V21, V22. This movement system is more visible in FIG. 5A, where the platform SO is mechanically integral to a crosspiece TR supporting a first set of suction cups V21, V22, V23, V24. This crosspiece TR can slide in translation between two rails RA1 and RA2, said rails themselves supporting a second set of suction cups V11, V12, V13 and V14. The suction cups of the first or second set have the characteristic of being controlled by the control station PC, which can activate their suctioning of water on a surface to produce the "suction cup" effect or can deactivate them so that they disengage from said surface.

Figure 5B:
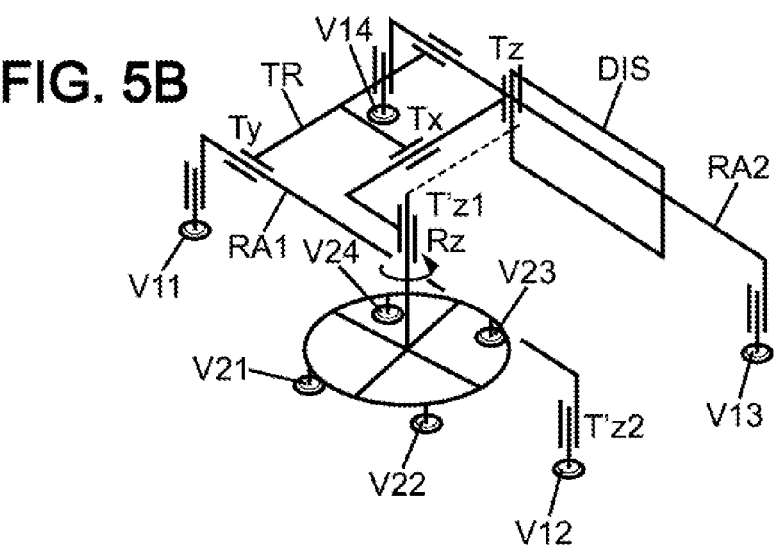
FIG. 5B schematically shows the various degrees of freedom of such movement means.

We now refer to FIG. 5B to describe the possible movements of one suction cup system relative to another. In the example shown, the first system of suction cups V21 to V24 is secured to a shaft Tz1' movable in translation (heightwise). In the embodiment shown, this shaft supports the dispenser DIS (dashed lines indicating the connection). Moreover, this shaft Tz1' is integral with a crosspiece TR movable in translation, longitudinally, along axis Ty. The dispenser itself can move laterally in translation along axis Tx, and heightwise along its own axis Tz. The shaft Tz1' can additionally move in rotation RZ to orient the first system of suction cups angularly relative to the second system of suction cups. In addition, the second system of suction cups V11 to V14 can be driven in translation, heightwise, along shaft Tz'2 in a sophisticated embodiment that is in no way required.

Figure 5C:
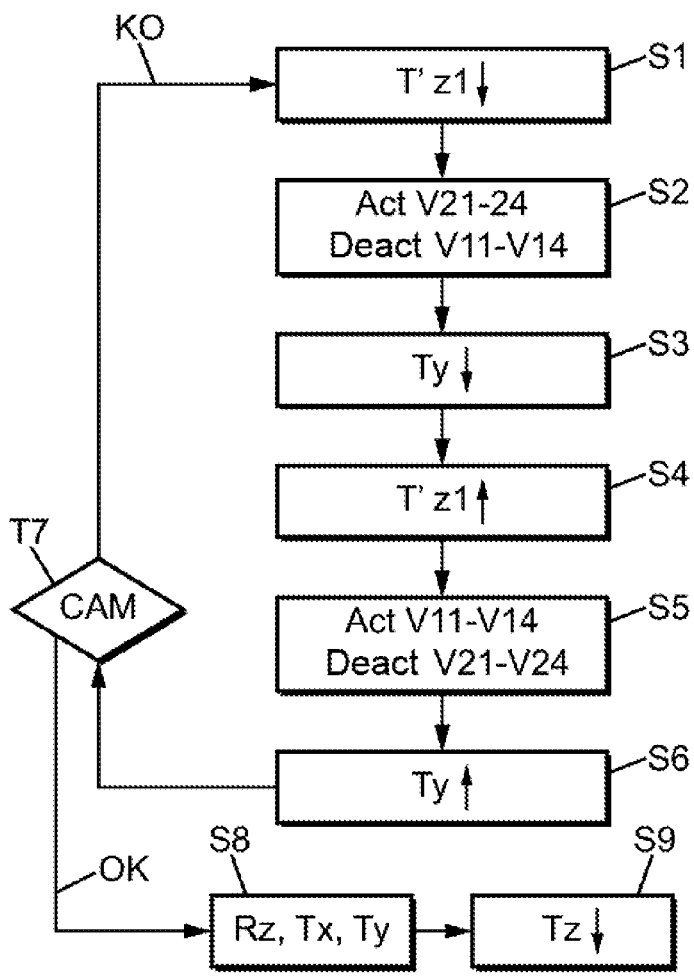
FIG. 5C shows the various steps of a movement method using the movement means of FIG. 5A.

We now refer to FIG. 5C to describe the mechanism for moving and using such a system as shown in FIG. 5B.

In a first step S1, the first system of suction cups is lowered by downward translation along shaft Tz'1. Simultaneously, in step S2, the first system of suction cups V21 to V24 is activated then the second system of suction cups V11 to V14 is deactivated. Suction cups V21 to V24 then adhere to the surface of the wall (for example vertical) of the pool, while the second system of suction cups V11 to V14 disengages from said surface. In step S3, translation along axis Ty, longitudinally, is ordered so as to "advance" the system of suction cups V11 to V14 relative to the first system of suction cups V21 to V24, and also relative to the wall of the pool, since the first system is fixed relative to the wall. Then, in step S4, the reverse mechanism of steps S1 and S2 is executed: the second system of suction cups V11 to V14 is lowered in step S4, and suction cups V11 to V14 are activated while the first system of suction cups V21 to V24 is deactivated. It will be understood that, in general, the robot device is advanced by the translation along axis Ty performed in step S3; it only remains to bring, in step S6, the first system of suction cups V21 to V24 to an initial position that will offer the highest possible amplitude for a future translation performed in a subsequent iteration of step S3.

The movement of the mobile robot can be controlled remotely to approach a seam, using the cameras carried by the robot (test T7). The movement of the robot continues (arrow KO exiting test T7) until it arrives at a suitable distance from the seam (arrow OK exiting test T7). When the robot is sufficiently close, in step S8 the angular position of the dispenser DIS is adjusted by rotation Rz, and the precise position of the dispenser DIS within the plane of the pool wall is precisely adjusted by translations along axes Tx and Ty, to place the dispenser exactly within the axis of the seam. Then, in step S9, once the dispenser head has been adjusted to be above the seam, the dispenser can be lowered in translation along axis Tz to start forcibly applying the tape against the seam. Next, the robot can move (translations along Ty) and the dispenser can be moved angularly Rz and within the plane Tx, Ty of the pool wall (and if necessary also heightwise Tz), as described above in the succession of steps S1 to S6.

Moreover, the suction cups of the robot's suction systems can be implemented for example in the form of a piston mounted on a cylinder and capable of discharging water from one or more successive cavities, allowing precisely adjustable adhesion of the suction cup. As indicated above, a degree of heightwise translation Tz for each suction cup can advantageously provide stability of the robot within a plane, in case of pronounced unevenness in the wall.

It is thus possible to initially apply the robot to a side edge of the pool (typically near the surface of the liquid it contains), and then to steer it towards the seam, with the robot adhering to the wall and moving relative to the wall until it reaches the seam.

Figure 6:
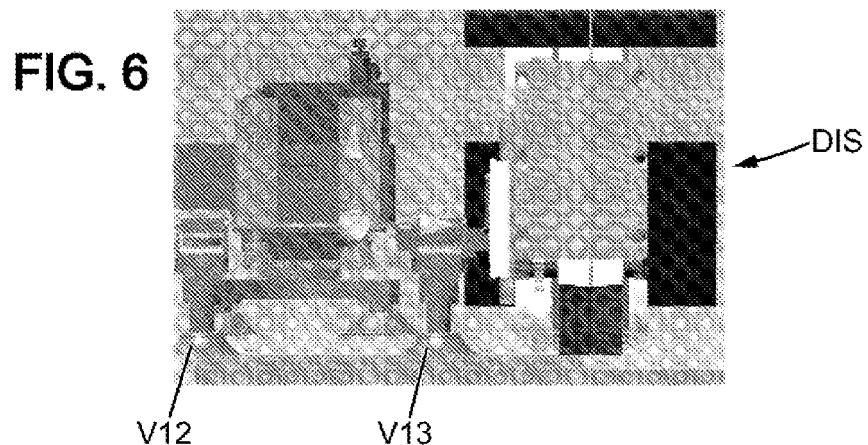
FIG. 6 shows an alternative embodiment in which the dispenser is offset relative to a mechanical frame carrying the suction cup system.

We have, of course, described an example in this embodiment where the dispenser DIS is integral to the shaft Tz1' supporting the first system of suction cups V21 to V24. Other embodiments are possible. For example, the dispenser may not be integral to this shaft, but rather to a shaft parallel to the axis of lateral translation Tx (representation according to FIG. 5B, disregarding the connection indicated by dashed lines). Such an embodiment provides movement similar to that described with reference to FIG. 5C, but allows offsetting the dispenser laterally to outside the area defined by the rails RA1 and RA2. FIG. 6 shows this variant: the dispenser DIS is outside the frame carrying the suction cups V11 to V14, which allows directly accessing a crack without interference by a rail RA1 or RA2.

More generally, the invention is of course not limited to the exemplary embodiments described above; it extends to other variants.

It is therefore understood that in a very simple embodiment, the general system for moving the robot can be based on a minimum of two suction devices. Indeed, it is sufficient for one suction device to move in translation relative to the other to cause a mobile robot in the sense of the invention to move.

The invention claimed is:

1. A method for sealing a seam in a wall of a pool of a nuclear facility, making use of a mobile robot carrying a dispenser for an adhesive tape, the method comprising:

controlling a plurality of suction systems, comprising a first suction system and at least a second suction system, the second suction system being part of a frame carrying a crosspiece movably mounted in the frame, the crosspiece being movable at least in translation relatively to the frame, said translation being along at least one direction in a plane parallel to said wall, the crosspiece supporting the first suction system via an arm and a rotation shaft perpendicular to said plane, the crosspiece supporting the arm, said arm supporting the dispenser, the arm supporting the shaft for adjusting the height of the dispenser relatively to the frame to apply the adhesive tape of the dispenser against the seam, the motion in translation of the crosspiece relatively to the frame making the first suction system being movable in translation relatively to the second suction system in order to adjust the position of the dispenser, the shaft being able to move in rotation to orient furthermore the first suction system angularly relative to the second suction system, and controlling the movement of the first suction system relative to the second suction system of said plurality of suction systems.

2. The method according to claim 1, wherein, to move the dispenser relative to a wall of the pool, alternating steps are ordered which comprise at least the following:

activating the plurality of suction systems while deactivating the first suction system, moving the first suction system relative to the second suction system in a given direction, activating the first suction system while deactivating the second suction system, moving the first suction system relative to the second suction system in a direction opposite the given direction.

3. The method according to claim 1, wherein the seam to be sealed is a weld between sheets covering an inner wall of the pool.

4. The method according to claim 3, wherein said weld contains a crack.

5. A mobile robot for sealing a seam in a wall of a pool of a nuclear facility, the mobile robot carrying a dispenser of an adhesive tape, and comprising:

a plurality of suction systems, comprising a first suction system and at least a second suction system, the second suction system being part of a frame comprising a crosspiece movably mounted in the frame, the crosspiece being moveable at least in translation relatively in the frame, said translation being along at least one direction in a plane parallel to said wall, the crosspiece supporting the first suction system via an arm and a rotation shaft perpendicular to said plane, the crosspiece supporting the arm, said arm supporting the dispenser, the arm supporting the shaft for adjusting the height of the dispenser relatively to the frame to apply the adhesive tape of the dispenser against the seam, the motion in translation of the crosspiece relatively to the frame making the first suction system being movable in translation relatively to the second suction system in order to adjust the position of the dispenser, the shaft being able to move in rotation to orient furthermore the first suction system angularly relative to the second suction system, and movement means for moving the first suction system relative to the second suction system of said plurality of suction systems.

6. The mobile robot according to claim 1, wherein the arm is mounted to move in translation relative to the crosspiece in at least a second direction that is different from the first direction.

7. The mobile robot according to claim 1, wherein the dispenser is mounted relative to the frame so that the dispenser is placed outside the frame.

8. The mobile robot according to claim 5, wherein the plurality of suction systems comprises suction cups with backflow of fluid.

9. The mobile robot according to claim 5, wherein the dispenser comprises a head that presses the tape against the wall and wherein said head includes a servomotor.

10. The mobile robot according to claim 5, wherein the adhesive tape is covered with a protective film.

11. The mobile robot according to claim 10, wherein the protective film is made of stainless steel.

12. A facility comprising a mobile robot for sealing a seam in a wall of a pool of a nuclear facility, the mobile robot carrying a dispenser of an adhesive tape, and comprising:

a plurality of suction systems, comprising a first suction system and at least a second suction system, the second suction system being part of a frame comprising a crosspiece movably mounted in the frame, the crosspiece being moveable at least in translation relatively in the frame, said translation being along at least one direction in a plane parallel to said wall, the crosspiece supporting the first suction system via an arm and a rotation shaft perpendicular to said plane, the crosspiece supporting the arm, said arm supporting the dispenser, the arm supporting the shaft for adjusting the height of the dispenser relatively to the frame to apply the adhesive tape of the dispenser against the seam, the motion in translation of the crosspiece relatively to the frame making the first suction system being movable in translation relatively to the second suction system in order to adjust the position of the dispenser, the shaft being able to move in rotation to orient furthermore the first suction system angularly relative to the second suction system, and movement means for moving the first suction system relative to the second suction system of said plurality of suction systems, and means for remotely controlling the suction systems and movement means comprised in the mobile robot.

* * * * *